(12) United States Patent
Lee

(10) Patent No.: US 7,419,122 B2
(45) Date of Patent: Sep. 2, 2008

(54) COMBINED SKIRT-REEFING AND SLIDER METHOD FOR CONTROLLED PARACHUTE OPENING

(75) Inventor: Calvin Lee, Needham, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 215 days.

(21) Appl. No.: 11/269,918

(22) Filed: Nov. 9, 2005

(65) Prior Publication Data

US 2008/0099623 A1    May 1, 2008

(51) Int. Cl.
*B64D 17/58* (2006.01)
(52) U.S. Cl. ........................................ 244/147
(58) Field of Classification Search ................ 244/142, 244/145, 146, 147, 152
See application file for complete search history.

(56) References Cited

U.S. PATENT DOCUMENTS

| | | | | |
|---|---|---|---|---|
| 2,566,585 A | * | 9/1951 | Smith | 244/152 |
| 2,754,074 A | * | 7/1956 | Schade | 244/152 |
| 3,408,026 A | * | 10/1968 | Kriesel | 244/152 |
| 4,513,931 A | * | 4/1985 | Kenzie | 244/152 |
| 4,540,145 A | * | 9/1985 | Matsuo | 244/152 |
| 5,005,785 A | | 4/1991 | Puskas | |
| 5,738,307 A | * | 4/1998 | Webb | 244/152 |
| 6,443,396 B1 | | 9/2002 | Berland | |
| 6,622,968 B1 | * | 9/2003 | St. Clair et al. | 244/138 R |
| 6,843,451 B1 | | 1/2005 | Fox, Jr. | |
| 6,886,785 B2 | | 5/2005 | Preston | |

* cited by examiner

*Primary Examiner*—Tien Dinh
(74) *Attorney, Agent, or Firm*—Vincent J. Ranucci

(57) ABSTRACT

A parachute system having a parachute canopy having a skirt, and a plurality of gores spaced about the skirt. The plurality of gores is defined by first and second groups of gores. The parachute system includes a slider having a plurality of through-holes, a line loop attached to the slider, a first reefing line extending through the first group of gores and having a pair of ends attached to the line loop, and a second reefing line extending through the second group of gores and having a pair of ends attached to the line loop. A corresponding group of suspension lines passes through a corresponding through-hole in the slider. Each suspension line in each group of suspension lines is attached to a corresponding gore. A single reefing line cutter is engaged with the line loop and configured to cut the line loop after a predetermined amount of time has elapsed so as to release the reefing lines and allow the slider to slide down the suspension lines.

18 Claims, 4 Drawing Sheets

COMBINED SKIRT-REEFING AND SLIDER METHOD FOR CONTROLLED PARACHUTE OPENING

STATEMENT OF GOVERNMENT INTEREST

The invention described herein may be manufactured and used by the U.S. Government for Governmental purposes without the payment of any royalties thereon.

BACKGROUND OF THE INVENTION

1. Field of the Invention

The present invention generally relates to a combined skirt-reefing and slider method for controlled parachute opening.

2. Description of the Related Art

An important and desirable operating capability in a parachute system is the ability to control the opening of the parachute so as to decrease its opening force. Such an operating capability provides for controlled and safe airdrops thereby protecting personnel and cargo. This aforesaid operating capability is particularly important for current precision airdrop systems that deploy parachutes at an altitude of about 25,000 feet. At this high altitude, the true aircraft speed is high as 200 knots (as compared to 130 knots near sea level). This relatively high aircraft speed results in extremely high opening forces if the parachute is not inflated in a controlled manner to decrease the peak opening force.

Parafoils (gliding ram-air inflated parachutes) are currently used to implement precision airdrops. In some instances, sliders are used on the parafoils to control the opening of the parafoil. However, the relatively high cost of parafoils prohibits the use of parafoils on a large scale. Other types of parachute systems used today include low cost, standard round cargo parachutes that are not designed for high altitude deployment. Skirt reefing techniques are commonly used to control the opening of round parachutes. These skirt reefing techniques typically use reefing lines in conjunction with pyrotechnic cutters. Other prior art techniques for controlling the canopy opening process use loose sliders. However, these aforesaid prior art techniques do not sufficiently address unacceptably high opening forces that jeopardize the structural integrity of both the canopy fabric and suspension lines.

What is needed is a cargo parachute system having a skirt reefing system that sufficiently reduces the opening forces and which is relatively more economical to implement in comparison to prior art cargo parachute reefing systems.

SUMMARY OF THE INVENTION

In one aspect, the present invention is directed to a parachute system that generally comprises a parachute canopy having a skirt, and a plurality of gores spaced about the skirt wherein the plurality of gores are defined by a first group of gores and a second group of gores. The parachute system includes a slider which is generally symmetrical in shape (e.g. square or circular) having a plurality of through-holes or openings, a line loop attached to the slider, a first reefing line extending through the first group of gores and having a pair of ends attached to the line loop, and a second reefing line extending through the second group of gores and having a pair of ends attached to the line loop. The parachute system further includes a plurality of groups of suspension lines. Each group of suspension lines passes through a corresponding through-hole in the slider. Thus, the quantity of through-holes in the slider depends on the quantity of suspension lines and the quantity of groupings of the suspension lines. Each suspension line in each group of suspension lines is attached to a corresponding gore. The parachute system also has a single reefing line cutter engaged with the loop and configured to cut the line loop after a predetermined amount of time has elapsed so as to release the reefing lines and allow the slider to slide down the suspension lines.

In a related aspect, the present invention is directed a device for controlling the opening process of a parachute, comprising a slider having a plurality of through-holes for the passage therethrough of suspension lines, a line loop attached to the slider, and a single reefing line cutter engaged with the line loop and configured to cut the line loop after a predetermined amount of time has elapsed.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1:
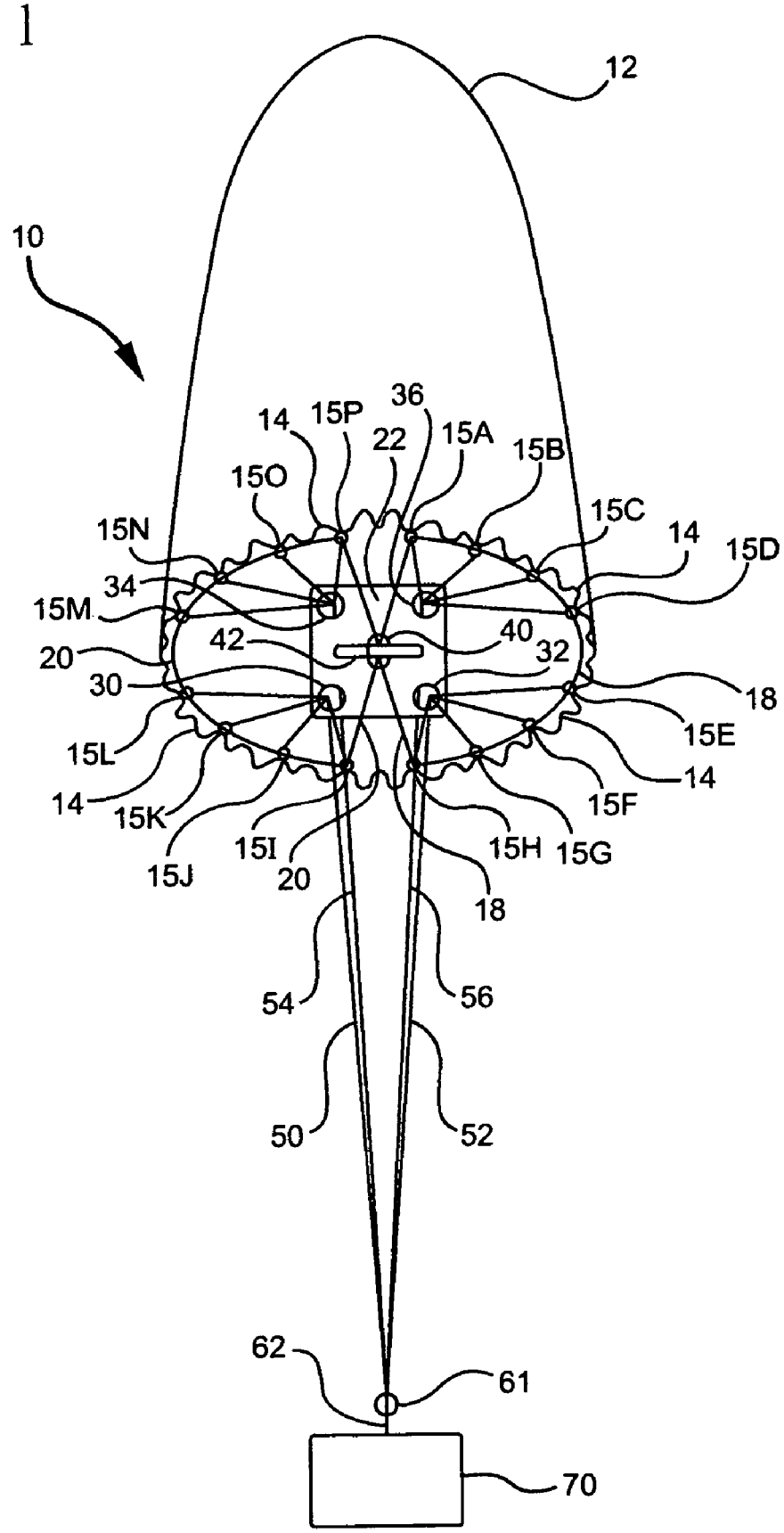
FIG. 1 is an elevational view, in perspective, of a parachute system in accordance with a preferred embodiment of the invention, the parachute being shown in an initial reefed state after deployment from an aircraft.

Referring to FIG. 1, parachute 10 of the present invention generally comprises a generally round canopy 12 which has canopy skirt 14. Parachute 10 further includes gores 15A-P, reefing lines 18 and 20, and slider 22. As shown in FIG. 1, there are sixteen gores 15A-P that are equidistantly spaced along canopy skirt 14. However, in alternate embodiments of the invention, there may be more than or less than sixteen gores. Reefing line 18 reefs gores 15A-H and reefing line 20 reefs gores 15I-P. Slider 22 is positioned at canopy skirt 14. Slider 22 is generally symmetrical in shape. In one embodiment, shown in FIG. 1, slider 22 is configured to have a generally square shape. In another embodiment, slider 22 is configured to have a generally circular shape. The quantity of openings in slider 22 depends on the quantity of suspension lines and their grouping. Each grouping passes through an opening. Slider 22 is configured in FIG. 1 to have openings 30, 32, 34 and 36. Each of these aforesaid openings is located in a respective corner of slider 22. Slider 22 is fabricated from suitable materials known in the parachute art.

Figure 2:
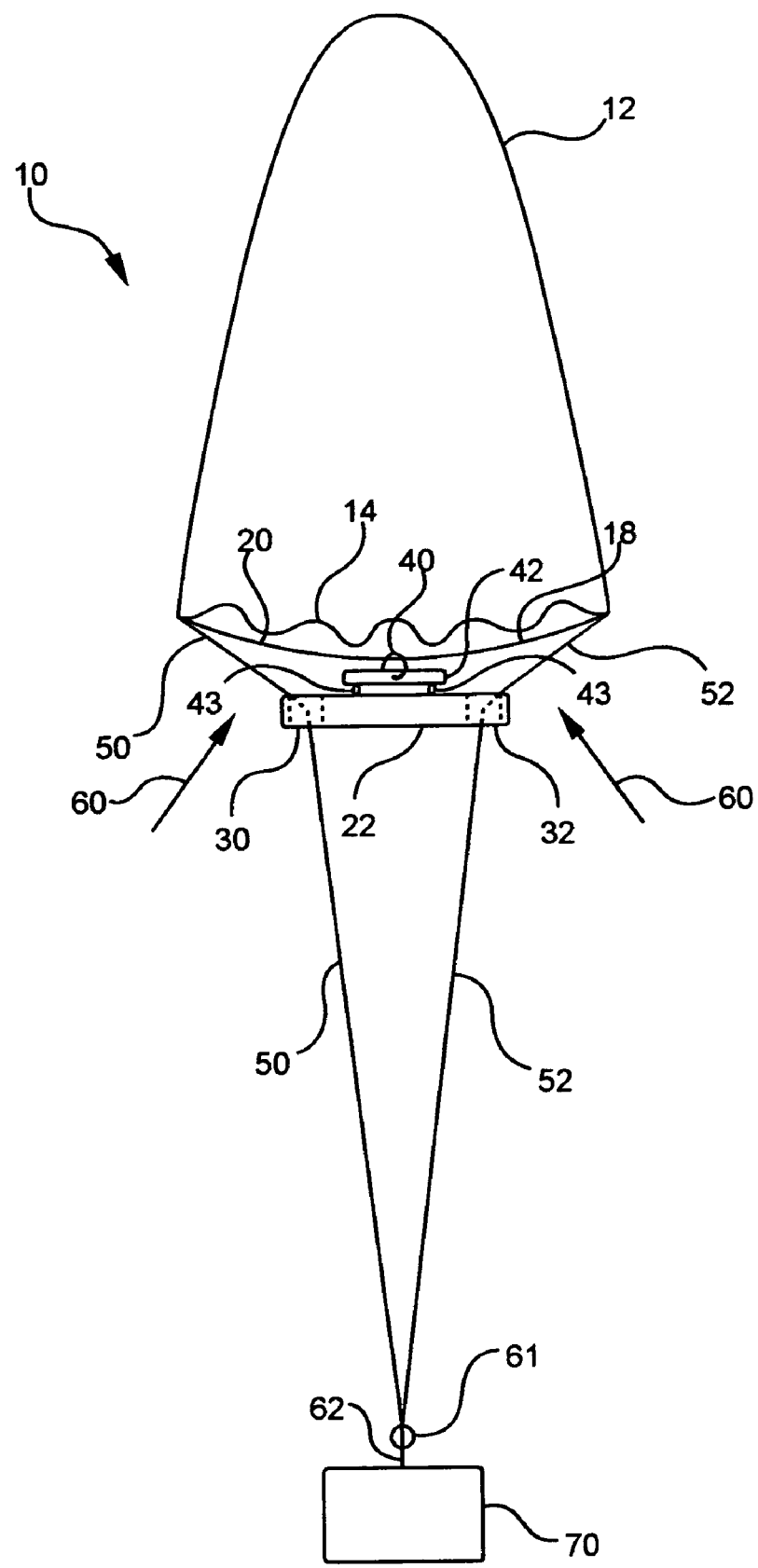
FIG. 2 is a simplified, side elevational view of the parachute system of FIG. 1.
Figure 3A:
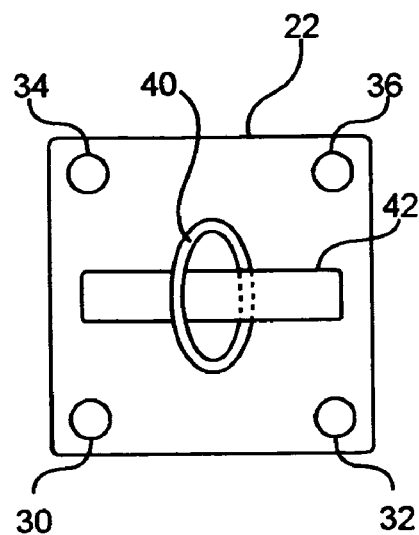
FIG. 3A is a top plan view of the slider depicted in FIGS. 1 and 2, the reefing lines and suspension lines not being shown for purposes of clarity and to simplify description of the invention.
Figure 3B:
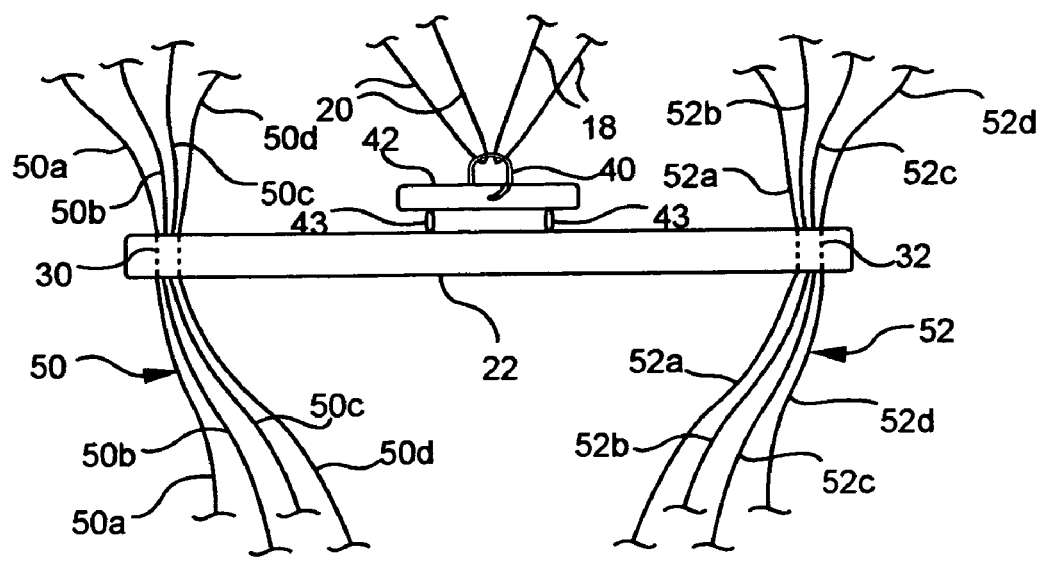
FIG. 3B is a side elevational view of the slider depicted in FIGS. 1, 2 and 3A, the reefing lines and suspension lines being partially shown.

Referring to FIG. 3A, there is shown a plan view of slider 22. For purposes of clarity and to simplify and facilitate description of the invention, reefing lines 18 and 20 and the parachute suspension lines are not shown in FIG. 3A. In a preferred embodiment, line loop 40 is sewn onto slider 22. In a preferred embodiment, line loop 40 is generally centrally located on slider 22. Line loop 40 goes through reefing line cutter 42. Reefing line cutter 42 is attached to slider 22, for example, with stitching 43, as shown in FIGS. 2 and 3B. Reefing line cutter 42 is configured to implement a cutting action after a predetermined amount of time has elapsed, i.e. the delay time. In a preferred embodiment, reefing line cutter 42 is configured as a pyrotechnic cutter which is well known in the art.

Referring to FIGS. 1, 2, 3A and 3B, both ends of reefing line 18 are connected to line loop 40. Similarly, both ends of reefing line 20 are connected to line loop 40. Parachute 10 further includes a plurality of groups 50, 52, 54 and 56 of suspension lines. Group 50 comprises four separate suspension lines 50A-D. Group 52 comprises four separate suspension lines 52A-D. Similarly, group 54 comprises four separate suspension lines, and group 56 comprises four separate suspension lines. For purposes of clarity and to simplify the ensuing description of the invention, the individual suspension lines in groups 54 and 56 are not shown. Suspension lines 50A-D pass through opening 30 in slider 22 and are connected to gores 15I-L, respectively. Suspension lines 52A-D pass through opening 32 in slider 22 and are connected to gores 15E-H, respectively. Similarly, suspension lines 54A-D pass through opening 34 in slider 22 and are connected to gores 15M-P, respectively. Suspension lines 56A-D pass through opening 36 in slider 22 and are connected to gores 15A-D. All of these aforesaid suspension lines are connected at link 61. Riser 62 is connected to and between link 61 and payload 70.

Figure 4:
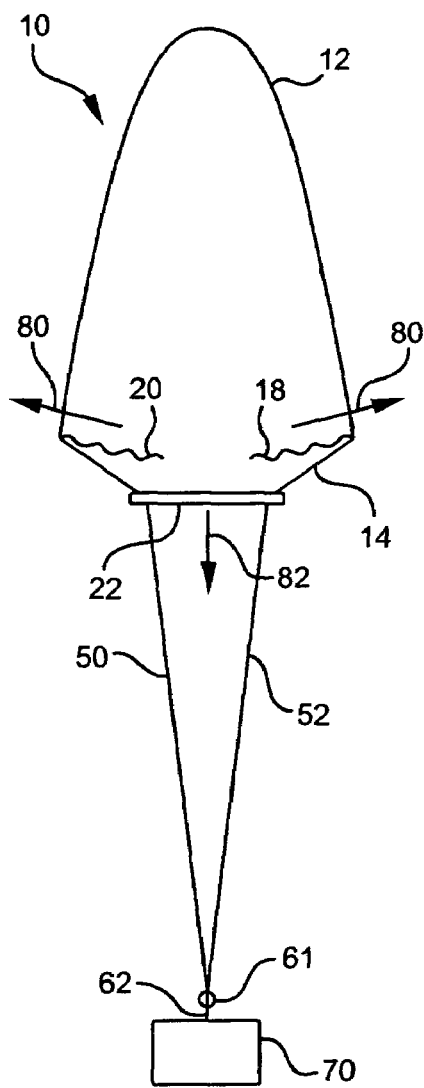
FIGS. 4 and 5 are side elevational views of the parachute system of the present invention, said views illustrating the downward movement of a slider as the parachute descends.
Figure 5:
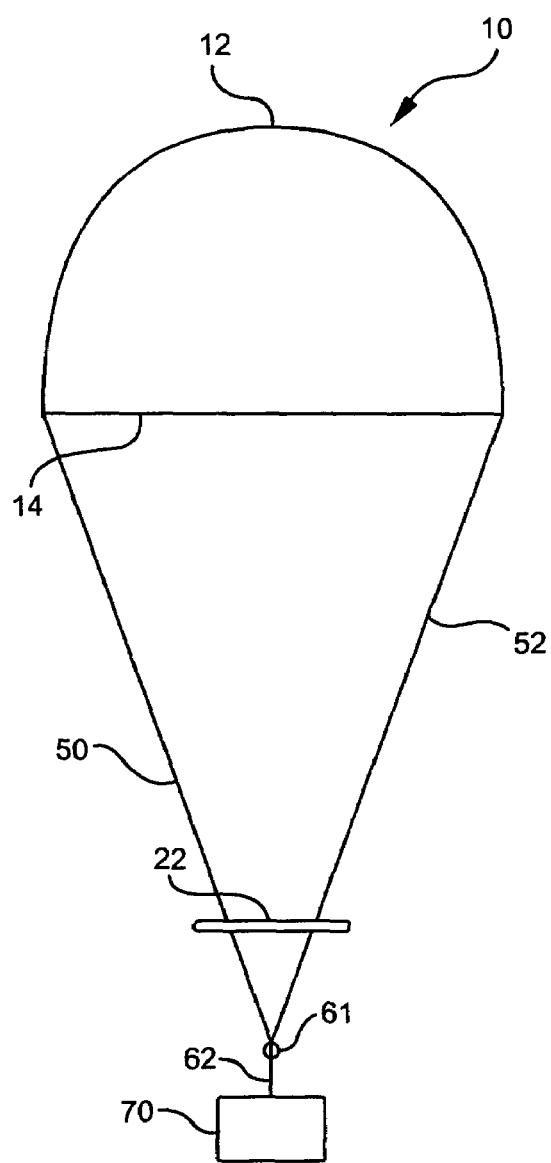

Referring to FIGS. 2, 3B, 4 and 5, as a result of the connection of reefing lines 18 and 20 to slider 22 in the manner described in the foregoing description, slider 22 is fixed at canopy skirt 14 during this reefed initial opening stage. Slider 22 impedes inlet airflow 60 to canopy 12 and thereby retards or slows the opening of canopy 12. The airflow around slider 22 is uniform. Thus, at this initial reefed stage, slider 22 functions as a diffuser that diffuses inlet airflow 60 to canopy 12 thereby retarding the opening of canopy 12. When the predetermined amount of time has elapsed, reefing line cutter 42 cuts line loop 40 which causes the release of reefing lines 18 and 20 as shown in FIG. 4. Canopy 12 then starts to inflate and expand as indicated by arrows 80. Slider 22 then starts to slide down the suspension lines of groups 50, 52, 54 and 56, as indicated by arrow 82, thereby controlling the opening process of canopy 12 and advancing canopy 12 to the second stage of opening. Eventually, slider 22 reaches the bottom of the suspension lines as shown in FIG. 5.

The present invention effectively controls the opening of parachute 10 using only one reefing line cutter as compared to two or four reefing line cutters used in many prior art parachutes. As shown in the foregoing description, the initial position of slider 22 is well controlled at canopy skirt 14 in contrast to the loose sliders commonly used in prior art parachute systems. Furthermore, the release of slider 22 is accurately controlled by the firing of reefing line cutter 42. When slider 22 is initially positioned at canopy skirt 14, slider 22 acts as a diffuser to improve the inlet airflow 60 and retard the opening of canopy 12. The interactive nature between reefing lines 18 and 20 and slider 22 allows for considerable flexibility in the selection of reefing time and slider size for different parachute canopy sizes and desired degree of opening control.

Thus, the present invention provides a parachute system that uses a combined skirt-reefing and slider technique that controls the opening of a parachute canopy and allows parachute to be used for either high-altitude or low altitude/high velocity deployment. The combination of skirt reefing and the of a slider in accordance with the invention provides an effective means to control and slow or retard the parachute opening and to provide airflow to the canopy during initial opening. The present invention may be implemented with cargo parachutes or with smaller parachutes designed for personnel or relatively small payloads.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not limiting the scope and spirit of the invention as set forth in the attached claims.

What is claimed is:

1. A parachute, for controlling its opening, comprising:
a canopy having a skirt;
a plurality of gores spaced about the skirt, the plurality of gores being defined by a first group of gores and a second group of gores;
a slider having a plurality of through-holes, said slider being positioned and fixed at the canopy skirt for impeding inlet airflow to the canopy and for slowing the opening of the canopy, said airflow around the slider being uniform;
a line loop attached to the slider;
a first reefing line extending through the first group of gores and having a pair of ends attached to the line loop, said first reefing line being connected to the slider;
a second reefing line extending through the second group of gores and having a pair of ends attached to the line loop, said second reefing line being connected to the slider;
a plurality of groups of suspension lines, each group of suspension lines passing through a corresponding through-hole in the slider, each suspension line in each group of suspension lines being attached to a corresponding gore; and
a single reefing line cutter, said cutter being attached to the slider, and said line loop going through the reefing line cutter, said cutter being configured to cut the line loop after a predetermined amount of time has elapsed so as to release said first and second reefing lines and said slider, and to allow the slider to slide down the suspension lines, whereby said single cutter reefs the canopy by releasing both reefing lines and the slide, and said single cutter controls opening the canopy by allowing the canopy to start to inflate and expand, and thereby allowing the slider to slide down the suspension lines for further opening the canopy.

2. The parachute system according to claim 1 wherein the slider is generally symmetrical in shape.

3. The parachute system according to claim 1 wherein the quantity of through-holes in the slider is dependent on the quantity of groups of suspension lines.

4. The parachute system according to claim 1 wherein the line loop is generally centrally located on the slider.

5. The parachute system according to claim 1 wherein the plurality of gores comprises sixteen gores, the first and second group of gores each comprising eight gores.

6. The parachute system according to claim 1 wherein the plurality of groups of suspension lines comprises four groups of suspension lines.

7. The parachute system according to claim 6 wherein each group of suspension lines comprises four suspension lines.

8. The parachute system according to claim 1 wherein the plurality of through-holes comprises four through-holes.

9. The parachute system according to claim 1 wherein the slider has a generally square shape.

10. The parachute system according to claim 1 wherein the slider has a generally circular shape.

11. The parachute system according to claim 1 wherein the single reefing line cutter comprises a pyrotechnic reefing line cutter.

12. The parachute system according to claim 1 further comprising means for attaching the suspension lines to a payload.

13. A device for controlling the opening process of a parachute, having a canopy including a skirt, comprising:
- a slider having a plurality of through-holes for the passage therethrough of suspension lines, said slider being positioned and fixed at the canopy skirt;
- a line loop attached to the slider;
- first and second reefing lines attached to the line loop, and said reefing lines being connected to the slider; and
- a single reefing line cutter attached to the slider, said line loop going through the cutter, the cutter being configured to cut the line loop after a predetermined amount of time has elapsed for releasing the reefing lines and the slider, and allowing the slider to slide down the suspension lines, said released reefing lines allowing the canopy to inflate and expand, and said released slider sliding down the suspension lines for further opening the canopy.

14. The parachute system according to claim 13 wherein the loop is generally centrally located on the slider.

15. The parachute system according to claim 13 wherein the single reefing line cutter is generally centrally located on the slider.

16. The parachute system according to claim 13 wherein the plurality of through-holes in the slider comprises four through-holes.

17. The parachute system according to claim 13 wherein the slider has a generally square shape, the plurality of through-holes being equidistantly spaced apart.

18. The parachute system according to claim 13 wherein the single reefing line cutter comprises a pyrotechnic cutting device.

* * * * *